(12) United States Patent
Marsh

(10) Patent No.: US 11,959,024 B2
(45) Date of Patent: Apr. 16, 2024

(54) BIOCOAL FUEL PRODUCT AND PROCESSES AND SYSTEMS FOR THE PRODUCTION THEREOF

(71) Applicant: BRITISH COLUMBIA BIOCARBON LTD., McBride (CA)

(72) Inventor: Phil Marsh, McBride (CA)

(73) Assignee: British Columbia Biocarbon Ltd., McBride (CA)

( * ) Notice: Subject to any disclaimer, the term of this patent is extended or adjusted under 35 U.S.C. 154(b) by 0 days.

(21) Appl. No.: 17/306,707

(22) Filed: May 3, 2021

(65) Prior Publication Data

US 2021/0284913 A1  Sep. 16, 2021

Related U.S. Application Data

(62) Division of application No. 15/746,336, filed as application No. PCT/CA2016/050855 on Jul. 21, 2016, now Pat. No. 10,995,274.

(60) Provisional application No. 62/195,252, filed on Jul. 21, 2015.

(51) Int. Cl.
| | |
|---|---|
| C10B 53/02 | (2006.01) |
| C10B 57/10 | (2006.01) |
| C10L 5/14 | (2006.01) |
| C10L 5/16 | (2006.01) |
| C10L 5/36 | (2006.01) |
| C10L 5/44 | (2006.01) |
| C10L 9/08 | (2006.01) |

(52) U.S. Cl.
CPC .............. *C10B 53/02* (2013.01); *C10B 57/10* (2013.01); *C10L 5/14* (2013.01); *C10L 5/16* (2013.01); *C10L 5/361* (2013.01); *C10L 5/363* (2013.01); *C10L 5/44* (2013.01); *C10L 5/447* (2013.01); *C10L 9/08* (2013.01); *C10L 2290/02* (2013.01); *C10L 2290/06* (2013.01); *C10L 2290/08* (2013.01); *C10L 2290/24* (2013.01); *C10L 2290/30* (2013.01); *Y02E 50/10* (2013.01); *Y02E 50/30* (2013.01)

(58) Field of Classification Search
CPC ............ C10L 2290/02; C10L 2290/06; C10L 2290/08; C10L 2290/24; C10L 2290/30; C10L 5/14; C10L 5/16; C10L 5/361; C10L 5/363; C10L 5/44; C10L 5/447; C10L 9/08; C10B 53/02; C10B 57/10; Y02E 50/10; Y02E 50/30
See application file for complete search history.

(56) References Cited

FOREIGN PATENT DOCUMENTS

| KR | 2006044509 A | * | 5/2006 | ................ C10J 3/66 |
| KR | 744813 B1 | * | 8/2007 | |

\* cited by examiner

*Primary Examiner* — Latosha Hines
(74) *Attorney, Agent, or Firm* — McCarthy Tétrault LLP

(57) ABSTRACT

A single pass method of production of an improved biocoal product according to which biomass is thermo-chemically broken down into its constituent components, the components are modified, and selected components are recombined to form a much more valuable fuel product which is more waterproof, more durable, and has a higher energy density than the original biomass. Other non-selected components may be used to provide energy to the biocoal production process.

14 Claims, 7 Drawing Sheets

BIOCOAL FUEL PRODUCT AND PROCESSES AND SYSTEMS FOR THE PRODUCTION THEREOF

CROSS REFERENCE TO RELATED APPLICATIONS

This application is a divisional of U.S. patent application Ser. No. 15/746,336 filed on Jan. 19, 2018, and incorporated herein by reference, which is a National Entry of International Patent Application PCT/CA2016/050855, filed Jul. 21, 2016, and incorporated herein by reference, and claims the benefit of U.S. Provisional Patent Application No. 62/195,252, filed Jul. 21, 2015, and incorporated herein by reference.

FIELD

The present disclosure relates generally to fuel production. In some aspects, the present disclosure relates to a coal-like fuel product, referred to as biocoal, produced from biomass materials. In some other aspects, the present disclosure relates to processes and systems for producing said biocoal fuel product.

BACKGROUND

Despite producing high carbon dioxide ("$CO_2$") emissions, coal currently is used to provide approximately 30% of global primary energy requirements. Coal is used to generate more than 40% of global electricity and to produce approximately 70% of world steel production. It is also responsible for approximately 45% of the world's $CO_2$ emissions.

In order to reduce $CO_2$ emissions, coal consumers are investigating replacing coal with other sources of fuel with lower $CO_2$ emissions. One such alternative fuel is biomass, which can be used to produce $CO_2$ neutral energy. Most commonly, biomass in the form of wood pellets are used to replace coal. The prior art wood pellets are prepared by passing a dried, finely ground wood powder through an extrusion press to form fuel pellets.

The use of biomass by coal operators, however, creates many technical problems and results in significantly higher costs. Compared to coal, wood pellets have less energy density, which increases freight costs. Whereas coal has an energy density of 27-31 GJ/T, the energy density of wood pellets is only 17 GJ/T. Wood pellets are not water resistant, resulting in a requirement for dry storage and handling facilities. In addition, wood pellets are less durable, creating waste and safety issues. Further, wood pellets have different chemical properties than coal, which will require plant and burner modifications in the conversion from coal to wood pellets. All of these factors diminish the usefulness of wood pellets as a coal alternative for most coal users. For some industries, such as the steel industry, wood pellets are not suitable as the heating value of wood pellets is insufficient.

In order to make biomass more useful as a coal replacement, efforts have been made to modify the biomass fuel at the production plant to make it more similar to coal prior to shipping. Such attempts to modify the biomass have been concentrated primarily in the areas of steam explosion and torrefaction.

Steam explosion is a process in which biomass is treated with hot steam at temperature of 180-240° C. under pressure of 1.0-3.5 MPa, followed by an explosive decompression of the biomass to result in a rupture of the rigid structure of the biomass fibers. During steam explosion, lignin is softened, released from the cell wall and distributed evenly onto the raw material. This softening and distribution of the lignin prior to pelletization increases the water resistance of the pellet and results in a moderately higher energy density of approximately 19 GJ/T.

In a torrefaction process, the biomass is heated to 250-300° C. under anaerobic conditions to evaporate lighter volatile fractions without destroying the lignin Once pelletized, the resulting pellets have increased water resistance and an increased energy density of approximately 22 GJ/T.

There are several limitations with prior art methods of biocoal production. For example, while the resulting biocoal from some prior art methods has an energy density up to 30% greater than that of wood pellets, and increased water resistance, the improvements do not result in a fuel which can replace coal, which has an energy density of 27-31 GJ/T.

SUMMARY

Aspects of the present disclosure relate to coal replacement (hereafter "biocoal") fuel products, methods of manufacture thereof, and systems for the production thereof. In some embodiments, the biocoal is waterproof, durable, and has a very high energy density comparable to coal.

In one aspect, there is provided a process involving pyrolyzing a biomass to produce a solid phase char and a tar-laden gas, condensing the tar-laden gas to produce a liquid phase tar, and mixing the liquid phase tar with the solid phase char. Between the condensing and the mixing, the tar is maintained at a temperature above a softening point of the tar.

Optionally, the pyrolyzing involves heating the biomass at a temperature of 650° C. or greater.

Optionally, the pyrolyzing involves heating the biomass at a temperature of 850° C. or less.

Optionally, the pyrolyzing is substantially performed at a heating rate from 25° C./min to 40° C./min.

Optionally, a gas flow arrangement for the pyrolyzing involves an updraft.

Optionally, the tar-laden gas exits at a temperature of less than 280° C. from a reactor in which the pyrolyzing is performed.

Optionally, the temperature at which the tar-laden gas exits is approximately 250° C.

Optionally, the liquid phase tar is condensed from the tar-laden gas at a temperature of 110 to 150° C.

Optionally, the process also includes reheating the liquid phase tar to a temperature between 180° C. and 250° C.

Optionally, the liquid phase tar is condensed from the tar-laden gas at a temperature of 180° C. to 250° C.

Optionally, the mixing is performed at a temperature above the softening point of the tar.

Optionally, the process also includes grinding a mixture produced by the mixing.

Optionally, the mixing and the grinding are performed at least partly simultaneously.

Optionally, the process also includes compacting a mixture produced by the mixing at a pressure of 10 tons or higher.

Optionally, the pressure for the compacting is 30 tons or higher.

Optionally, the compacting involves compacting the mixture into at least one of briquettes or pellets.

In another aspect, there is provided a fuel product involving a mixture of a solid phase char and a tar. The mixture is produced by pyrolyzing a biomass to produce the solid phase char and a tar-laden gas, condensing the tar-laden gas to produce the tar in a liquid phase, and mixing the liquid phase tar with the solid phase char. Between the condensing and the mixing, the tar is maintained at a temperature above a softening point of the tar.

In still another aspect, there is provided a system having a carbonizer configured to perform pyrolysis, a condenser configured to receive a gas output from the carbonizer and to produce a liquid phase tar, and a mixing vessel configured to receive a solid phase char from the carbonizer and the liquid phase tar. The mixing vessel is operable to mix the solid phase char and the liquid phase tar. The system is configured to maintain the tar at a temperature above a softening point of the tar.

Optionally, the system also has a dryer configured to supply dried biomass to the carbonizer.

Optionally, the system also has a combustor configured to receive a combustable gas from at least one of the carbonizer or the condenser and to combust said combustable gas for at least partially heating the dryer.

In yet another aspect, there is provided a fuel product having a combination of a char component and a tar component. The char component has a fixed carbon content of at least 75% on a dry basis, the tar component has a softening point of at least 80° C., and the combination has a density of at least 830 kg/m$^3$.

Optionally, the fixed carbon content is at least 85% on a dry basis.

Optionally, the fixed carbon content is at least 90% on a dry basis.

Optionally, the fuel product has an energy density of 27 to 33 GJ/T.

Optionally, the energy density of the fuel product is approximately 30 GJ/T.

Optionally, the char component has a cumulative pore volume of at least 0.0150 ml/g and at least 70% of the cumulative pore volume is contributed by pores with pore diameters of less than 10 nm.

Optionally, the cumulative pore volume is at least 0.0170 ml/g and at least 70% of the cumulative pore volume is contributed by pores with pore diameters of less than 6 nm.

Optionally, the softening point is lower than 150° C.

Optionally, the tar component is 30 to 60 wt % percent of the combination.

Optionally, the tar component is 45 to 55 wt % of the combination.

Optionally, the density of the combination is at least 1,000 kg/m$^3$.

Optionally, the density of the combination is approximately 1,300 kg/m$^3$.

Optionally, the liquid phase tar has a differential scanning calorimetry (DSC) melting peak.

Optionally, the DSC melting peak is 120° C. or higher.

Optionally, the DSC melting peak is lower than 165° C.

BRIEF DESCRIPTION OF THE DRAWINGS

Embodiments of the invention are described below by way of example only and with reference to the accompanying drawings, in which.

Figure 1:
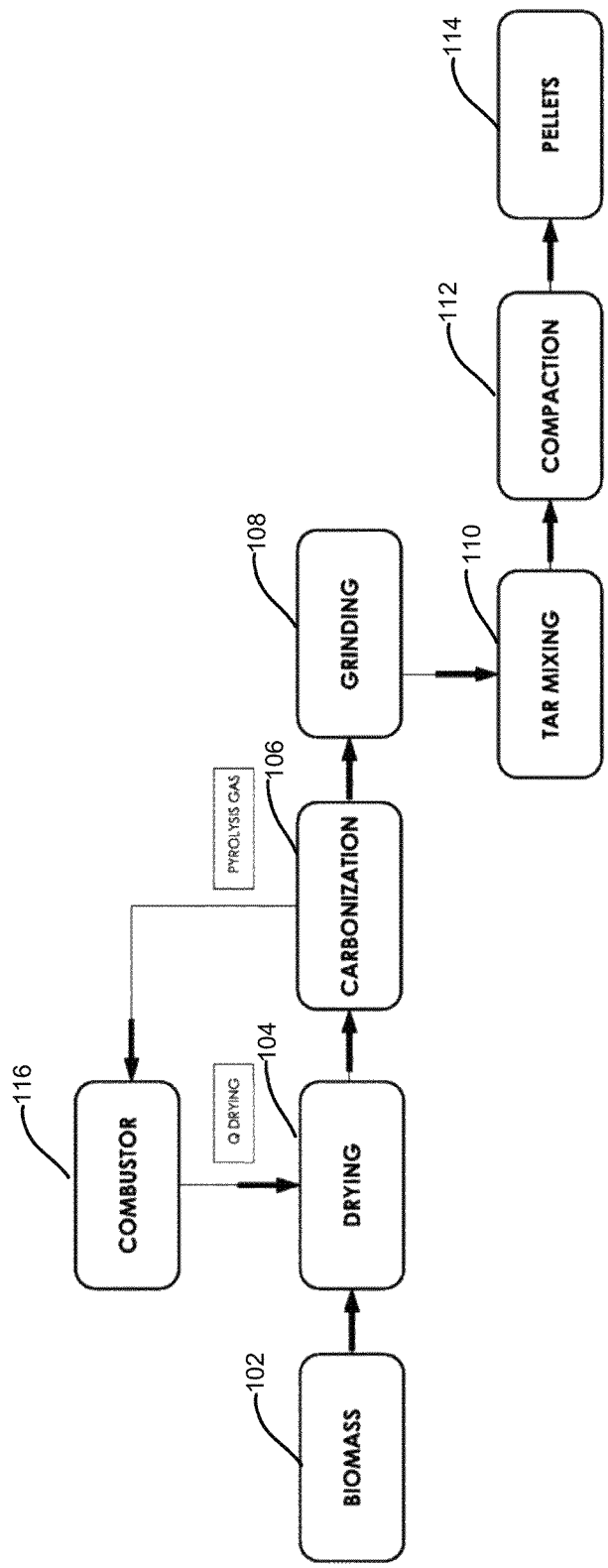
FIG. 1 is a process flow diagram for production of a biocoal fuel product, according to an embodiment.

It is to be expressly understood that the accompanying drawings and their corresponding detailed description are intended only for the purpose of illustration and as an aid to understanding, and are not intended as a definition of the limits of the invention.

DETAILED DESCRIPTION

Definitions

Throughout this description, numerous terms and expressions are used in accordance with their ordinary meanings as would be understood by a skilled person. For additional descriptive clarity, provided below are definitions of certain terms and expressions used in the description that follows.

A "fixed carbon content" refers to the solid combustible residue that remains after a sample is heated and the volatile matter is expelled. The fixed-carbon content of the sample is then determined by subtracting the percentages of moisture, volatile matter, and ash from the sample.

A "specific surface area" (SSA) refers to a SSA value measured by the Brunauer-Emmett-Teller (BET) technique which is most commonly known for determining the surface area of powders and porous materials. Nitrogen gas is generally employed as the probe molecule and is exposed to a solid under investigation at liquid nitrogen conditions (i.e., 77 K).

The terms "pore volume" and "pore-size distribution" are used in connection with degree of porosity of char, and refer to the relevant measurements that are obtained based on the Barrett-Joyner-Halenda (BJH) calculation, which is well-known in the art. The BJH calculation can be carried out using either adsorption or desorption isotherms. For the purpose of this specification, the terms pore volume and pore-size distribution refer to the values calculated from the desorption branch unless otherwise specified.

The term "DSC melting peak" used herein is defined as a temperature around which a differential scanning calorimetry (DSC) curve for a tar material shows a distinct endothermic transition relating to tar melting. Above this peak temperature, the relevant tar material or composition can become significantly less viscous and therefore exert improved flow properties. The DSC melting peak of a tar can be higher than the softening point of the tar by, for example, approximately 15-20° C. It is noted that while tars are solidified into a brittle solid and also melt in a certain range of melting points, they do not have any definite melting point.

A "softening point" refers to a temperature at which a tar material attains a particular degree of softening under specified conditions of test. Generally, the temperature at which a tar material reaches a viscosity of 10$^3$ Pa·s is understood as the defined softening point of the tar material. Various methods are known for the measurement thereof. Typically, a ring and ball apparatus according to ASTM D36 or a cup and ball apparatus (Mettler method) according to ASTM D3104 are used. For the purpose of this specification, a softening point means the softening point measured by the ring and ball method (ASTM D36).

A "glass transition temperature" (Tg) refers to a temperature at which a material changes state from a hard, brittle material to a flexible semi-solid (viscoelastic state). It has been reported that there is a relationship between the Tg of the tar and its softening point as determined by the conventional method such as a ring and ball method. The Tg of a tar can be lower than the softening point of the tar by, for example, around 60° C.

The term "durability" refers to a mechanical durability. For the purpose of this specification, durability values are measured in a Ligno-tester in accordance with the EN 14961-2 standard.

The term "energy density" is interchangeably used with "energy content" or "Higher Heating Value" (HHV).

The term "coking point" refers to a temperature at which heavy molecules start to be broken into lighter oils or distillates by thermal cracking (coking). The final product of coking is a form of carbon called coke. Coking is known to exhibit predominantly exothermic reactions which can coincide with swelling phenomena of tars.

Overview

Embodiments of the present invention provide a novel single pass method and system of production of an improved biocoal fuel product according to which biomass is thermochemically broken down into its constituent components, the components are modified, and selected components are recombined to form a much more valuable fuel product with very different properties from the original biomass, including increased water resistance, greater durability, and increased energy density. The remaining unselected components may be used to provide energy to the biocoal production process of the present invention.

Biocoal production aims to create a "drop-in" fuel to be used in applications where fossil coal is used today. Compared to fossil coal, biomass has low energy density, tends to adsorb and retain water, and does not have the same chemical or physical properties as coal. In order to be useful and widely adopted by the coal industry, it is desirable that the biomass be modified to create a fuel product which meets accepted coal standards. One of those standards is that the fuel product must be a strong, rock-like substance that can withstand the abrasions of transportation and material handling systems without excessive dusting, as well as be sufficiently water resistant or waterproof, so that the fuel product can be stored outside in a large pile without leaching or adsorbing large amounts of water.

As an example of issues involved in the conversion of biomass into fuel products, in some previously known production processes where carbonaceous biomass (e.g., wood chips) is fully carbonized in a carbonization retort through pyrolysis to produce a high energy content char (30 GJ/T or greater), only 20-30% of the initial mass remains with the char, and roughly 40% of the initial energy remains. Such char has a great affinity to adsorb water, and such char has no self-adhesion properties. The remainder of the mass (i.e., 70-80% of the initial mass) and energy (roughly 60%) then exit as pyrolysis gases through a stack of the carbonization retort. After such a carbonization, while the energy density and carbon content of the resulting mass is high, much like coal, the overall energy recovery efficiency from biomass is low and the product cannot be transported or stored like coal.

To address these issues, the char may be bound together using a strong, water-proof binder that has a high energy content. Further, it is desirable that this binder be extracted from the initial biomass if energy recovery efficiency is to be acceptable. Embodiments of the present invention do this by capturing an energy dense, thermally-setting, water-proof binder comprising tars from the exhaust gas stream of the carbonizer. As described above, the majority of the mass and energy from high temperature pyrolysis in some previous production processes would exit the carbonization retort in gas phase through the stack. These gases consist of a great variety of compounds including $H_2$, $CH_4$, $CO$, $CO_2$, acetic acid, water vapor, alcohols, numerous long-chain hydrocarbons, and many other compounds, some of which are readily condensable and some of which are not. Of these compounds, the long-chain hydrocarbons (i.e., tars) are easily condensable, contain most of the gas phase energy, are extremely hydrophobic, and will turn into solids as their temperature decreases towards ambient. Embodiments of the present invention condense out a certain group of these tars, modify them to adjust their set point, then mix these tars back with the char to form a strong, dense, water resistant or waterproof biocoal fuel product that has a number of properties similar to traditional fossil coal. In addition, production of a biocoal product in accordance with the present disclosures can achieve high overall recovery from the input biomass.

Properties of the Biocoal Fuel Product

The biocoal fuel product produced according to embodiments of the present invention include (i) a porous carbon char and (ii) a tar composition. The porous carbon char and the tar composition are mixed together and, in some embodiments, are also compressed. In some preferred embodiments, the porous carbon char has a fixed carbon content of at least 75% on a dry basis. In some preferred embodiments, the tar composition has a softening point of at least 80° C. In some preferred embodiments, the biocoal fuel product has a density of at least 830 kg/m$^3$. It should be understood that these physical properties are provided as examples and that other values are possible in some embodiments.

The biocoal fuel product produced according to some embodiments of the present invention is waterproof or water resistant, has high durability, and has an energy density comparable to that of fossil coal. In one example embodiment, the energy density of the solid biocoal fuel product is approximately 30 GJ/T.

The carbon char of the biocoal fuel product according to embodiments of the present invention has a high fixed carbon content. In some embodiments, the carbon content of the char is at least one of 75% or greater, 80% or greater, 85% or greater, 90% or greater, or 95% or greater, on a dry basis. In addition, the carbon char has a relatively high specific surface area (SSA). In some embodiments, the SSA value of the carbon char is at least one of 50 m$^2$/g or greater, 65 m$^2$/g or greater, 80 m$^2$/g or greater, or 85 m$^2$/g or greater. With respect to pore characteristics, the porous carbon char has a relatively high pore volume and relatively small pore sizes. In some embodiments, the char has a cumulative pore volume of at least one of 0.0120 ml/g or greater, 0.0150 ml/g or greater, 0.0165 ml/g or greater, or 0.0170 ml/g or greater, where at least 70% of the cumulative pore volume is contributed by pores with pore diameters of at least one of less than 20 nm, less than 16 nm, less than 12 nm, less than 10 nm, less than 8 nm, or less than 6 nm.

The tar composition of the biocoal fuel product has a softening point that is high enough to permit transport and storage of the biocoal fuel product under some typical conditions without becoming sticky. In some embodiments, the softening point of the tar composition is at least one of 80° C. or higher, 90° C. or higher, 95° C. or higher, 100° C.

or higher, 105° C. or higher, 110° C. or higher, or 115° C. or higher. In other embodiments, the softening point of the tar composition is at least one of the ranges: 80-135° C., 90-130° C., 95-125° C., 100-125° C., or 110-120° C. In some preferred embodiments, the softening point of the tar composition is lower than 150° C.

The parameters that generally determine the softening point of a tar composition are the average molecular weight, the glass transition temperature (Tg), and the chemical composition of the tar composition. In some embodiments of the invention, the Tg of the tar composition is above room temperature. In other embodiments, the Tg is at least one of 40° C. or higher, 50° C. or higher, 55° C. or higher, or 60° C. or higher. In some preferred embodiments, the Tg of the tar composition is lower than 80° C.

The softening characteristics of a tar composition can be assessed with its DSC curve. In some embodiments, the tar composition has a DSC melting peak of at least one of 95° C. or higher, 105° C. or higher, 110° C. or higher, 115° C. or higher, 120° C. or higher, 125° C. or higher, 130° C. or higher, or 135° C. or higher. In other embodiments, the melting peak of the tar composition is at least one of the ranges: 95-165° C., 100-160° C., 110-155° C., 125-150° C., or 130-145° C. In some preferred embodiments, the softening point of the tar composition is lower than 165° C.

A higher softening-point tar can provide an advantage that the solid fuel product can withstand a higher ambient temperature before it starts to get sticky or soften and also be less likely to leach when the product sits continuously in water. The upper limit of the softening point of a tar composition can be introduced for balance with process efficiency during the fuel production; for example, overall energy recovery from an input biomass and mixability with the solid char can be considered.

The biocoal fuel product according to embodiments of the present invention has a high density. In some embodiments, the density of the biocoal fuel product is at least one of 830 $kg/m^3$ or greater, 850 $kg/m^3$ or greater, 900 $kg/m^3$ or greater, 950 $kg/m^3$ or greater, 970 $kg/m^3$ or greater, 1,000 $kg/m^3$ or greater, 1,050 $kg/m^3$ or greater, 1,100 $kg/m^3$ or greater, 1,200 $kg/m^3$ or greater, 1,250 $kg/m^3$ or greater, or 1,300 $kg/m^3$ or greater. In other embodiments, the density ranges between at least one of 830-1,350 $kg/m^3$, 850-1,110 $kg/m^3$, 930-1,350 $kg/m^3$, or 1,250-1,350 $kg/m^3$.

The solid fuel can be in form of pellets or briquettes. In some implementations, the averaging density of the pellets or briquettes can be 830-1,350 $kg/m^3$, 850-1,110 $kg/m^3$, 930-1,350 $kg/m^3$, 1,250-1,350 $kg/m^3$. In other implementations, the average density of the pellets or briquettes can be approximately 1,300 $kg/m^3$.

With respect to energy density, generally speaking, a tar composition with a higher softening point and a high average molecular weight can generally yield a higher energy density than a tar composition with a lower softening point and a lower average molecular weight. In some embodiments, the energy content of the biocoal fuel product is 27 to 33 GJ/T. The energy content of the carbon char is 25 to 30 GET in some embodiments, and the energy content of the tar composition is 25 to 35 GJ/T in some embodiments.

For comparison, bituminous coal is of higher quality than lignite coal and typically has the density of 833 $kg/m^3$ and the energy density of 24-35 GJ/T. Anthracite is considered to be of higher quality than bituminous coal; it has the density of 1,300-1,400 $kg/m^3$ and the energy density of 26-33 GJ/T.

By mixing and compressing a highly porous char and a heavy-fraction tar composition, embodiments of the present invention yield a biocoal fuel product of the quality comparable to high quality fossil coals. In one embodiment, the biocoal product has the density of approximately 1,300 $kg/m^3$ or greater and the energy density of approximately 30 GJ/T or greater. A high density and a high energy content are greatly desirable for transportation and storage of the fuel, not to mention the industrial applicability and versatility of the fuel. In addition, because of the tar composition adsorbed on the internal and external surfaces of the char, the biocoal fuel product, according to some embodiments of the invention, exhibits excellent durability and water-resistant or waterproof characteristics.

Production of the Biocoal Fuel Product

According to the process of the invention, the input biomass is completely carbonized at a temperature exceeding 300° C., preferably between 400° C. and 1,000° C., more preferably between 450° C. and 700° C., further more preferably between 650° C. and 850° C. This carbonization devolatilizes the biomass sending 60-80% of the dry mass into the exhaust in the form of combustible gases and leaving 20-40% of the biomass behind in solid form consisting mainly of amorphous carbon, or char. The process completely collapses the molecular structure of the original biomass. The char produced is a good adsorption media, especially for organic molecules, as it contains no self-adhesion properties and is very porous with high surface area.

While several of the gases driven off during carbonization, including water, carbon monoxide, carbon dioxide, methane, and other low molecular weight hydrocarbons, are not condensable under the operating conditions required, most of the gases given off during carbonization consist of long chain hydrocarbons in the form of oxygenated tars, water vapour, or acids that will all re-condense into liquids as the gas temperature cools. By controlling the pyrolysis gas temperature after evolution, the group of tars condensed may be controlled, and water vapour and lighter volatiles may be allowed to pass through the condenser or adsorption vessel.

During carbonization, various factors affect the amounts and types of condensates that will be distilled out of a biomass feedstock; these include moisture content, particle size, particle heating rate, maximum temperature, and direction of gas flow with the particle bed.

A very high moisture-content feedstock can create marginally more heavy-fraction of tar than lower moisture-content feedstock but there is a process trade off. A high moisture-content feedstock can also create far more water vapour within the system, which eventually needs to be removed from the system by condensation. Otherwise, the water vapour can be carried to a burner, along with other non-condensable gases, which may cause a serious problem in combustion of the non-condensable gases. In order to avoid these problems, it is preferred to use a sufficiently low moisture-content feedstock.

If moisture content of a feedstock is greater than 55%, some portion of char and tar may need to be diverted to a combustor to add more energy to the dryer. If moisture content of a feedstock is less than 55%, then the amount of output product can continue to be increased up to a certain point but there can still be a limit for a feedstock moisture content around 20-25%, which comes out as heat (i.e., non-condensable gas).

Large particle sizing promotes tar formation. In addition, very slow heating rates (<2° C./min) favour the production of non-condensable gases while medium heating rates (10-100° C./min) favour heavy tars and high heating rates (>1,000° C./min) favour lighter oils. Further, higher maximum temperatures drive more condensable volatiles out of the biomass.

Updraft arrangement is preferred for tar formation. When the evolving gases flow towards a hotter region of the char bed within a given reaction zone (downdraft), different secondary chemical reactions will more likely occur amongst the evolving gases than when the evolving gases flow towards a cooler portion of the bed (updraft). Moving towards a hotter zone, the evolving gases will be "thermally cracked", creating groups of lighter volatiles.

In preferred embodiments, a feedstock has a medium moisture content, for example, 10-20 wt %. A relatively large particle size is preferred, for example, 12 mm thickness or greater; a medium heating rate is preferred, for example, 25-40° C./min; a high maximum temperature is preferred, for example, reaching up to 800° C.; and an updraft operation mode is preferred, where gases flow from hottest area to cooler area within the bed. This can create more favourable conditions for the creation of heavy tars within the carbonizer and allow the tars to exit in the gas stream.

The pyrolysis gases exit the carbonization retort and proceed to a vertically mounted shell and tube heat exchanger. The gas exit temperature can be controlled in a wide range but preferably, does not exceed a coking point of the condensable gases which approximately ranges from 280° C. to 285° C., depending on the types of feedstock. Above this temperature, the condensing gases can re-carbonize (forming solid "coke") and plug off the exit pipe, by losing the chemical matrix that allows the tar to re-melt and by forming a permanent carbon matrix (the so-called "coke"). In some implementations, the gas exit temperature is sufficiently below a coking point of the condensable gases, or 30° C. below a coking point of the condensable gases; in other implementations, the gas exit temperature is 150-285° C., 180-280° C., 190-265° C., or 200-250° C.; in yet other implementations, the gas exit temperature is approximately 250° C. or lower.

The pyrolysis gas enters the condenser at the top and proceeds vertically down the condenser tubes cooling as it goes. As the gases cool, the heavier molecules condense into liquids along the walls of the tubes and drip down into a tar collection vessel attached to the bottom of the condenser. The coolant (air) enters at the bottom of the shell portion and moves upward to exit at the top of the heat exchanger forming a counter current heat exchange. The operating temperature of the heat exchanger is controlled by thermocouples measuring the gas temperature and increases or decreases air flow through the exchanger to maintain operating temperature.

The condensing gas temperature can be varied widely; in some implementations, the temperature is 110-150° C., 120-150° C., or 140-150° C.; in other implementations, the temperature is approximately 110° C. or approximately 120° C. Uncondensed gases are extracted from the plenum between the shell-and-tube and the liquid tar level, these gases are sent to the burner for combustion.

In one embodiment, a tar service tank can be employed in order to maintain tar liquid warm enough for the purpose of liquid form injection into the char, which is important for mixing a liquid phase with a solid phase; the warmer the liquid phase is, the better the mixing into the solid phase. In some embodiment, the tar service tank maintains the tar liquid at a temperature above the softening point of the tar composition. In another embodiment, the tar service tank maintains the condensed tar at approximately 150° C. or lower.

The condensed tar can be reheated back up to a certain temperature above the condensing gas temperature. In some implementations, the reheating temperature is 180-280° C., 180-250° C., 190-250° C., or 190-230° C., wherein the reheating temperature, preferably does not exceed the gas exit temperature discussed above. Reheating evaporates lower-molecular tar compounds, thereby refining the condensed tar liquid to be a heavier fraction of the tar. By increasing the average molecular weight, the softening point of the tar also increases.

A relatively high softening point of the tar composition is beneficial for the finished biocoal product since it indicates that the product is more thermally-stable. For example, the tar composition condensed at 120° C. would still give off some volatiles and be sticky at room temperature. During transportation, a biocoal product is often stored in a steel box and situated to a high-temperature environment; the fuel pellets then stick together into lumps due to the low softening point of the tar composition. Reheating can be carried out at the bottom of the condenser or at the tar service tank.

Alternatively, the pyrolysis gas can be condensed at a higher temperature (i.e., the reheating temperature) without subsequent reheating to obtain a heavier fraction of tar. However, there may be a limitation based on the scale of the condenser. If the condenser is at a high temperature and its size is not sufficiently large, there may be no enough residence time for all of heavier tars to condense; some of heavier tars may still be sent off to a burner system.

In overall, the softening point of the tar composition can be controlled by the maximum final temperature applied to the condensed tar, which can be the gas-condensing temperature itself in case there is no reheating or reboiling step, or the reheating temperature applied after the condensation of the tar. Once again, the maximum final temperature, preferably, cannot exceed the gas exit temperature discussed above.

The liquid collection area below the condenser consists of the collection tank, high level and low level liquid sensors, temperature sensor, immersion heater, tar extraction port and tank drain. The liquid level sensors ensure the tar level remains above the immersion heater and below the gas extraction port. The temperature sensor in conjunction with the immersion heater maintains the desired tar reboiling temperature.

As the condensing tars drip into the tank below, they get immediately stratified along a thermal gradient with the heavier tars sinking to the bottom and the lighter ones re-vaporizing off the top and exiting with the non-condensable gases to the burner. The heavier tars are then extracted off the bottom of the tank and taken to a holding tank prior to being mixed back with the char to form biocoal briquettes. The drain is required to insure complete removal of liquid tars should a shutdown be required, as the tar will set solid if allowed to cool. All tanks and lines on the liquid portion of the machine are insulated and heat traced to ensure liquid temperature are maintained during operation.

Having isolated a good quality char and a good quality tar from the original biomass, the two can be mixed back together at appropriate ratios and then formed to a desired shape under pressure and temperature to produce a very strong, waterproof pellet that has an energy density exceeding 30 GJ/T and is made of 100% biomass.

In a preferred embodiment, the char can be ground to sufficiently small particles and then mixed with the tar liquid. In a more preferred embodiment, the mixing of the char and the tar can be carried out substantially simultaneously with the grinding of the mixture. In the latter case, the bulk char from the carbonizer is received by the hopper leading to a screw feeder of a mixer-grinder. The screw feeder is also equipped with a nozzle through which the liquid tar from the condenser is injected. In case a tar service tank is employed to maintain the tar temperature for mixing, the nozzle is connected to the tar service tank.

Preferably, the tar can be mixed with the char at a temperature above its softening point, so that the viscosity of the tar can be low enough for the tar to flow properly. Under this condition, the tar can coat and wet the surface area of each particle of the porous char and fill in the pore spaces, thereby increasing the density, water-resistance, and durability of the final biocoal product.

The tar content needs to be sufficiently high, so that the tar can function as a binder that holds the char particles together. The minimum tar content can be about 20% based on the total weight of the mixture of the tar and the char. In some implementations, the tar content is preferably 30-60 wt %, more preferably 45-55 wt %. A tar content of approximately 50 wt % may be preferred because of the two reasons; first, a very durable, waterproof pellet can be produced and second, the energy output from the biomass input can be maximized since the weight ratio of a good-quality tar to a good-quality char recovered by embodiments of the present invention is roughly 1:1.

Once the mixture of the char and the tar is prepared, for example at the mixer-grinder, it is transferred to a briquetter to form pellets or briquettes under a pressure. A higher pressure can generally yield a higher-density pellet or briquette. In some implementations, the pressure can be approximately 10 tons or higher, or approximately 30 tons or higher. In some implementations, the pressure can be 100 MPa or higher, 120 MPa or higher, 150 MPa or higher, 200 MPa or higher, 300 MPa or higher, 350 MPa or higher, 400 MPa or higher, or 500 MPa or higher. In other implementations, the pressure can be 100-1,200 MPa, or 120-1,000 MPa, or 350-950 MPa.

In one embodiment, biocoal pellets with the averaging density of about 1,300 kg/m$^3$ are produced by a process in which the char and the tar at the weight ratio of roughly 1:1 are mixed and ground together by a mixer-grinder apparatus at a temperature above the tar softening point, and then compacted by a briquetting apparatus under a pressure of 100-350 MPa.

There is a slight trend of increasing density with tar content and there is a more definite effect of compacting pressure on the final pellet density: the higher the pelletizing pressure the higher the density of the pellets or briquettes.

With reference to FIG. 1, which depicts one embodiment of the biocoal production process of the invention, the improved biocoal production process comprises several steps. First, the biomass material (102) is dried (104). The dried biomass is transferred to a carbonization retort where it is devolatilized to form char and tar laden gases (106). Volatile gases are directed to a combustor (116) to generate heat for drying the biomass. The char is ground (108) and mixed with the tar laden gases (110) and cooled to a selected temperature to permit condensation of certain tars onto and into the char. The tar-char mixture is then compacted (112) to be formed into biocoal pellets (114).

According to the present invention, several methods of recombining the char and the tar may be used. As described above, the char may be ground while still hot then directed on a continuous flow basis to a vertical paddle mixer used as an adsorption vessel. Concurrently, the pyrolysis gases from the carbonizer are routed to the adsorption vessel such that they enter at the top of the vessel and flow concurrently with the char from top to bottom, while the paddles are stirring the mixture to ensure maximum contact of the char with the gases. As the gas and char descend through the mixer together, they are cooled and any tars that were formed above the existing mixer temperature will condense out onto and into the very porous char. The gases that do not condense at the prescribed mixer temperature will exit at the bottom of the vessel into an outgoing pipeline to be sent to a combustor or gasifier. The resultant char, now mixed with the heavier condensed tars, exits to a briquetting system to be formed into a hard, energy dense, waterproof biocoal product.

According to an alternate embodiment of the recombination process, the char and tar may be cooled and condensed into solids. Both char and tar then may be ground into powders, mixed together, and reheated prior to being formed into the biocoal product. According to yet another embodiment, the solid char may be ground prior to being mixed with the hot liquid tars before briquette formation.

In some preferred embodiments, the mixing is performed at a temperature at least above the softening point of the condensed tar.

Figure 3:
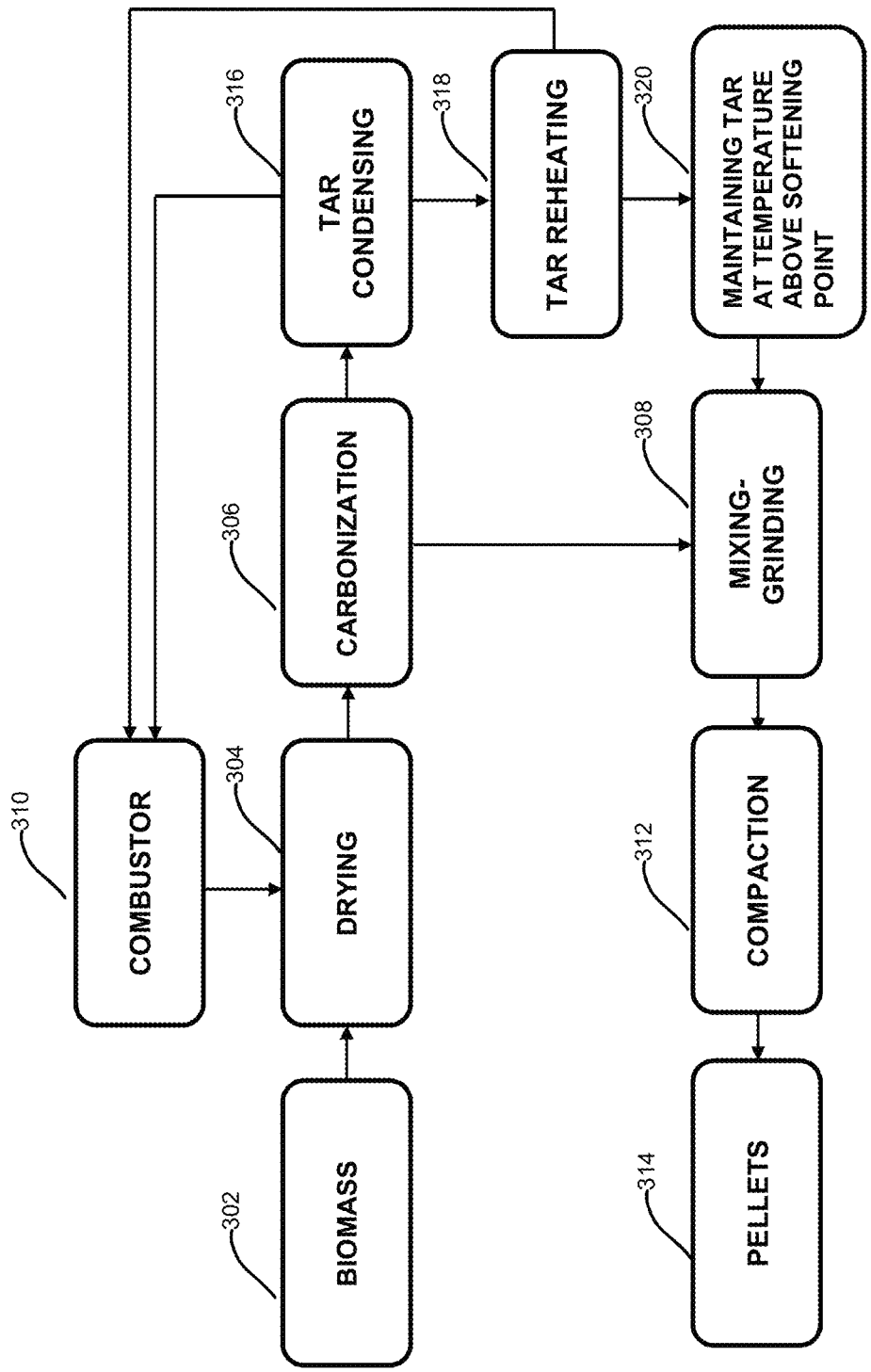
FIG. 3 is a process flow diagram for a biocoal fuel product, according to another embodiment.

FIG. 3 depicts another embodiment of the biocoal production process of the invention. Similar to the process depicted in FIG. 1, the biomass material (302) is dried (304) and then the dried biomass is transferred to a carbonization retort where it is devolatilized to form char and tar laden gases (306). In this embodiment, the tar laden gases are transferred to a tar condenser (316). Non-condensable gases are directed to a combustor (310) to generate heat for drying the biomass and heavy tar is condensed into a liquid and collected at the bottom of the condenser. The collected tar liquid is then reheated (318) to evaporate lighter oils, which are sent to the combustor. Optionally, a tar service tank can be employed to maintain the tar liquid sufficiently warm for the purpose of injection into the char, for example, at a temperature above the softening point of the tar (320). The char in a solid phase and the tar in a liquid phase are mixed and ground together (308). The tar-char mixture is then compacted (312) to be formed into biocoal pellets (314).

According to one aspect of the invention, the energy density of the biocoal product produced may be controlled. By controlling temperature and residence time in the carbonizer, the biomass to char recovery ratio may be varied to set the fixed carbon content of the resultant char and, therefore, the energy density of the char.

Simultaneously, the selected time and pyrolysis gas temperature profile may be used to determine the quantity and type of the tars produced while ensuring water vapour and other light volatile gases pass through the condenser or adsorption vessel. The liquid tars have high molecular masses and are extremely viscous. As the temperature of the liquid drops below their formation temperatures, they become so thick as to be, effectively, a solid. These tars are very hydrophobic and have high energy values, ranging from 25-31 GJ/T.

Similarly, by controlling the temperature and residence time of the char and gas phase tar within the adsorption vessel, the type and amount of tar that will re-condense into and onto the char may be controlled. In combination these two processes may be used to set the overall mass recovery from the biomass, the fixed carbon level, the volatiles level, the water resistance of the mixture, and the durability of the resulting biocoal product. Essentially, the process will permit production of a made-to-order biocoal product. In a preferred embodiment, the biocoal product will be a highly durable, waterproof, 100% biomass pellet that has an energy density exceeding 30 GJ/T.

Figure 2:
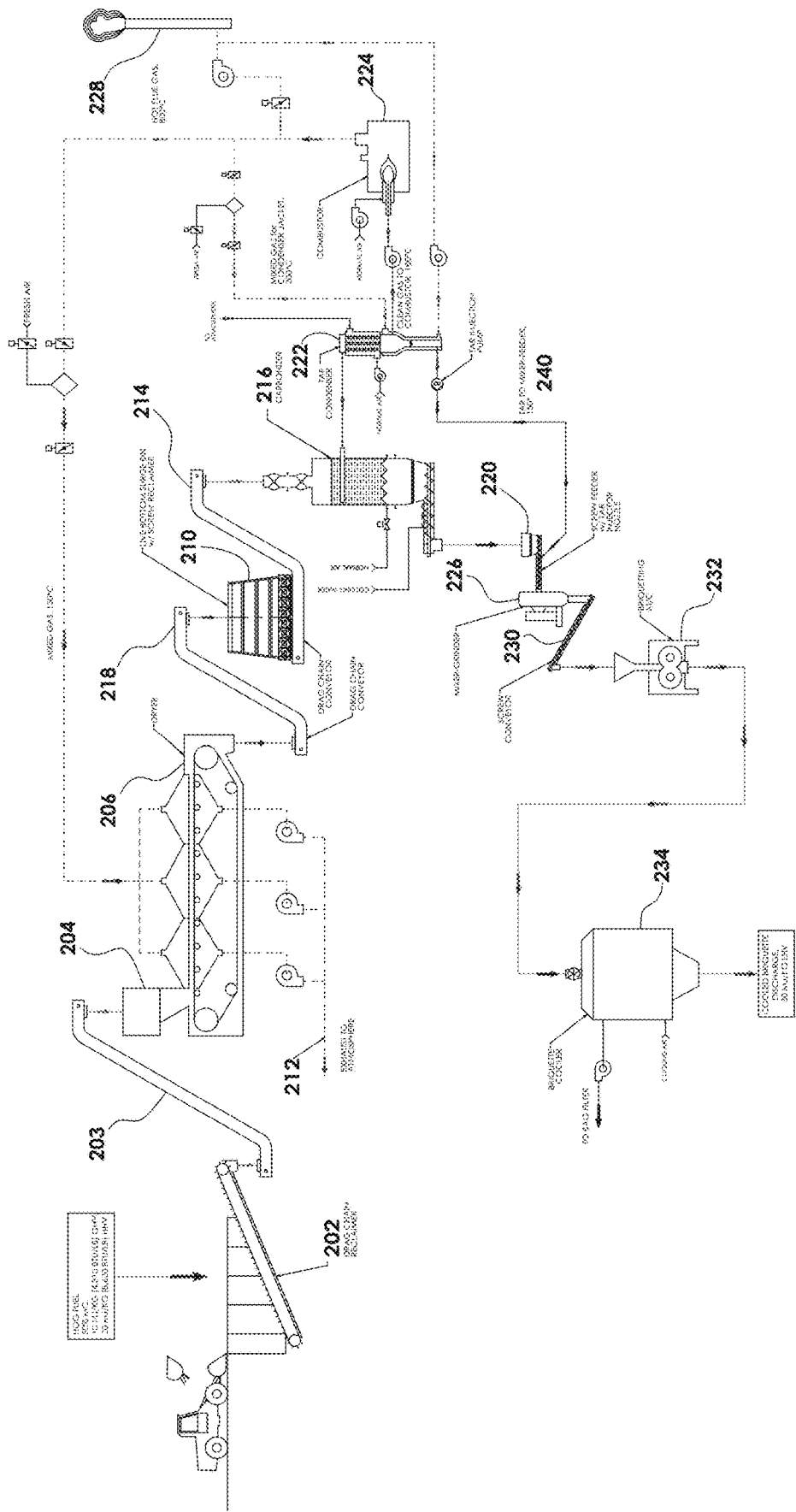
FIG. 2 is an engineering schematic of a biocoal processing plant, according to an embodiment.

According to another embodiment of the system of biocoal production of the present invention, as depicted in FIG. 2, hog fuel biomass may be transferred to a drag chain reclaimer (202) for deposit on to a first drag chain conveyor (203) and conveyance to a hopper (204) on a dryer (206). The dryer is selected to reduce the moisture content of the input biomass materials to below 20%, most preferably below 10%. The dried biomass exits the dryer and is deposited onto a second drag chain conveyor (218) for conveyance to the top of a surge bin (210). The exhaust gas (212) from the dryer may be exhausted to the atmosphere.

A third drag chain conveyor (214) transfers the biomass material to the top of a carbonizer retort (216) for devolatilization. The resultant char is fed into a screw feeder (220). The tar laden gases produced in the carbonizer are transferred to a tar condenser (222). Clean volatile gas from the tar condenser is passed to a combustor (224) to produce a hot flue gas which is then mixed with air to heat the biomass dryer. Selected condensed tars are fed into the screw feeder and enter a mixer grinder (226) where they are combined and ground with the char. The tars from the tar condenser are maintained at about 150° C. (240) until they reach the mixer grinder. A tar service tank can be used for maintaining the tars at any desired temperature for mixing and grinding with the char. Emission gases may be condensed in a stack condenser (228).

A screw conveyor (230) feeds the ground char-tar mixture into a briquetting machine (232), which compacts the mixture. The resulting biocoal pellets are air-cooled in a briquette cooler (234) to produce the finished biocoal pellet product.

An individual carbonizer retort of the system of the invention is a steel bin oriented vertically and lined with high temperature insulating material for thermal protection. At the top is an air-lock fuel feeder to allow solids to be introduced to the retort. At the bottom it has an air-locked char removal auger. The retort remains air sealed at all times except for what is introduced by the control system.

Slightly above the char removal auger is a specialized rotating grate system and a gas inlet connection. The grates are made of high temperature materials and consist of a series of parallel shafts to which four equally spaced fins have been welded. The fins are made of perforated plate which allows gas to flow freely up through the grate from the gas inlet below. Odd and even shafts are orientated 180 degrees out of phase with each other such that from above the fins appear to create a solid bed but when rotated the grate can continuously dump a controlled and evenly distributed mount of char through the grate in the same manner as a star feeder. On one side of the retort, each grate shaft is connected through the retort wall via a heat shielded bushing and seal then attached to a straight cut gear such that each gear drives the shaft next to it. By rotating one main shaft, the entire grate system is synchronized. On the opposite side of the retort, the grates are connected through the retort wall in the same fashion allowing the grate shafts to rotate freely in their bushings. The plenum cover plate on this side just ensures a gas tight seal and is used for grate installation and removal for maintenance purposes.

In the gap formed between the char removal auger and the grate system is the gas inlet line which allows external gas mixtures to enter immediately below the perforated grate into the gas distribution zone where the gas can evenly distribute itself before being sucked up into the carbonization bed. The gas inlet line is connected through unions to individual control valves to allow air and carbonization gas control as directed by the control system.

The retort may be equipped with a series of sensors that feed information to the control system. Below the top of the retort is a gas outlet connection that is attached to the outlet distribution system via control valves such that the gases can be directed either to the gasifier or the condensing unit. The retort has no moving parts apart from the inlet and outlet feeders and the rotating grate system.

The system further comprises gas distribution lines to allow for controlling gas flows to and from individual retorts. There are two gas manifolds, one on the inlet and one on the outlet. Control valves situated at each retort regulate gas entry from the inlet manifold to control temperature, composition, and flow rate within the retort. Inlet gases consist of air, steam, oxygen or other gas mixtures and are used to control carbonization temperatures and outlet gas compositions. Outlet gases during carbonization are directed through a second manifold line to the partial oxidizer/gasifier or directly to combustor via the distillation condenser if liquid pyrolysis products are desired, or if not the distillation condenser is bypassed.

The adsorption vessel is a vertically oriented tube paddle mixer filled with hot char that is being cooled as it descends through the tube to exit out the bottom. The pyrolysis gases also enter at the top and flow concurrently with the char then exit to the combustor or gasifier at the bottom of the mixer. The char entering the absorber has been pre-ground to a diameter of 4 mm or smaller prior to entry and its sizing in conjunction with the mixing paddles serves to control the pressure drop across the vessel. The temperature and residence time of the char is also controlled so as to select the amount and type of tars that are adsorbed by the char. The tar/char mixture is then removed via a transfer auger to the briquetting machine.

The pyrolysis gas condenser is a modified shell and tube heat exchanger where the hot pyrolysis gases flow through the tubes while cooling fluid is pumped counter-current through the shell. The condenser unit is oriented vertically such that condensate forming on the inside of the tubes runs down to the bottom manifold and is removed via a pee trap system to maintain the seal. This allows the capture of certain condensable fractions of the pyrolysis gas stream such as tars for further refining.

The combustor is a modified natural gas burner designed to oxidize the producer gas at high temperature and produce thermal energy. If the fuel gas is coming through the gasifier system first then the combustor could be substituted with an internal combustion engine, fuel cell, or other appliance if shaft power or electricity generation is required. Only a portion of the exhaust gas energy is required to be fed back into the system to sustain the process.

The stack condenser allows hot flue gases and dryer exhaust gases to flow through the tubes while cooling water is pumped through the shell. The stack condenser serves two purposes; firstly, it acts as a particulate scrubber for emissions purposes. Any fine particulate that may be entrained in the flue gas is forced to travel a long distance through an ever cooling tube; these particles act as nuclei for the water vapour in the flue gas as it reaches its dew point and are precipitated out with the condensate effectively scrubbing the particles from the gas. At the same time a large amount of low grade heat is recovered which would otherwise be lost up the stack. The heat may then be used to heat buildings and dry input biomass to increase the overall system efficiency.

A condensate system is used to store, filter, and treat the effluent from the stack condenser. Some condensate will be re-vaporized to condition the char during cooling mode and in situations where the feed stock is already very dry, a small amount of make-up water will be required.

Fuel pre-conditioning may be required as the equipment for handling bulk solids is limited in the variance it can tolerate and the speed of carbonization is related to the diameter of the fuel particle. Accordingly, agglomeration of very fine particles, size reduction of large particles, screening and sorting of input fuel may occur prior to carbonization. The biomass is dried prior to carbonization. As water is the first molecule to be driven off in any thermal process and it has no fuel value, it is much less problematic to deal with water removal before it gets mixed with the high temperature volatiles driven off during carbonization.

Incoming biomass will flow through the pre-processing, fuel storage and reclaiming areas of the plant and then into the dryer at rates determined by the carbonization process. Dry biomass will flow from the dryer system to the individual carbonizer retort as required to meet optimal carbonizer conditions for the desired biocoal product.

Dry biomass may be metered into the individual retort through an airlock system and internal sensors will maintain a desired bed depth within the retort. Bed depth may vary depending on the size and shape of the biomass fuel.

Using suction from a VFD controlled carbonizer fan, a pressure differential may be created across the fuel bed in the retort from bottom to top. On initial system start, a small amount of air will be allowed through the gas inlet connection and a direct flame applied to the bottom of the fuel bed. Alternatively an electric igniter may be used. Once the flaming biomass reaches carbonization temperatures of approximately greater than 285° C., the airflow may be reduced to pyrolytic conditions (oxygen starved) as the carbonization reactions are slightly exothermic and will create a self-sustaining environment.

This process is designed to devolatilize the biomass, driving off the oxygen and hydrogen components in gaseous form while leaving most of the carbon behind in the form of solid char. The pressure differential causes heat created in the bottom of the fuel bed to move upward through the bed transferring energy to the incoming fuel as it moves down towards the grate. Also a controlled amount of oxygen using air or steam/oxygen mixture may be allowed into the retort to create further exothermic reactions, speeding up the carbonization process, and producing some desirable effects such as greater surface area in the product char. The pyrolysis gases from this stage are directed to the pyrolysis gas condenser.

The carbonization process is regulated within the retort by controlling the input gas composition, temperature, and the char residence time. The process is monitored by reading the thermocouple array within the retort and by using a time/temperature profile to ensure consistent product output. As the char at the grate reaches its desired fixed carbon to volatile matter ratio the slowly rotating grate dumps the hot char through the gas inlet distribution zone and onto the char removal auger.

Once carbonization is complete the char must be cooled, conditioned and/or modified prior to release to the atmosphere.

As the char lands on the removal augers, its temperature will be 400° C. or higher. The augers are slightly inclined to form a plug flow system with no air space. As the char travels up the auger a controlled amount of water is sprayed onto the char inside. The water instantly turns to steam to cool the char, simultaneously forming a steam seal and at the same time reacting with dangling bonds within the char to reduce its reactivity to oxygen upon release to the air. This is important because dangling bonds are highly reactive and when exposed to air will react with oxygen in an exothermic reaction which could in extreme cases lead to spontaneous combustion of the product. The steam is immediately extracted from the high point on the auger. By controlling the amount of water injection, the degree of cooling may be controlled.

The char is cooled to roughly 250° C. then ground to adsorption vessel specifications. After leaving the grinder the char is moved to the adsorption vessel where it is hot mixed with the pyrolysis gases leaving the carbonizer retort then the mixture of char and condensed tar travels on to the briquetting machine in an insulated auger to maintain mixture temperatures at 150° C. The material is then hot briquetted using a roller press with 30T roll off pressure, and dropped onto a screen and at last transferred through a cooler prior to being placed in storage. Screened fines are returned to the briquetting machine to be recycled. The first air exposure of the biocoal is upon leaving the briquetter.

The gases created during carbonization form a wide variety of oxygenated organic compounds with the bulk of them being tar like substances. These gases form at different temperatures and condense at different temperatures so the carbonizer operating temperature affects the type and amount of gases produced. Most of these combustible gases can be condensed into liquids although there are some non-condensable gases such as $CO_2$, carbon monoxide, hydrogen, and light hydrocarbons.

Upon leaving the carbonizer, the gas is passed through the pyrolysis gas condenser to remove desired tars and then to the gasifier, or finally the gas could route through the adsorption vessel and then to the gasifier.

Empirical Characterization of Examples of the Biocoal Fuel Product

Some empirical results for characterizing example embodiments of the biocoal fuel product will now be provided. The following empirical results intended to be illustrative of some embodiments of the invention and are not intended to limit the scope of the invention.

Preparation of Char and Tar Samples

Char and tar samples were prepared from whole log chipped Lodge Pole Pine feedstock obtained from the Prince George area of British Columbia, Canada. The char sample was produced by carbonizing the feedstock at a maximum carbonization temperature of 800° C., with a residence time of 30 minutes. The heating rate was not completely linear, and took roughly 20 minutes to reach 400° C. and then reached 800° C. in the next 10 minutes. Bulk char was produced, with particles up to 3 cm in size. The fixed carbon content of the char sample was 95.3% on a dry basis. For the tar samples, the pyrolysis gas from the carbonization was condensed to a liquid tar at 110° C. Two types of tar were prepared by reboiling the condensed liquid tar. Type I was obtained by reboiling to 190° C. and type II was obtained by reboiling to 230° C. The type I and type II samples will be referred to herein as the "taffy" and the "brittle", respectively, based on their physical characteristics at room temperature.

Surface Area and Pore Analysis of the Char Sample

The surface area and porosity of the char sample were measured with a SA™ 3100 surface area and pore size analyzer (produced by Beckman Coulter Inc., Indianapolis, USA) using the Brunauer, Emmett, and Teller (BET) technique. Nitrogen gas was employed as the probe molecule and was exposed to the solid char sample at liquid nitrogen conditions (i.e., 77 K). The BET surface area was measured to 86.838 m$^2$/g (one-point BET surface area (Ps/Po=0.3): 87.439 m$^2$/g). Empirical surface area results from the corresponding analysis are provided in Table 1 below.

TABLE 1

| Surface Area Report | |
| --- | --- |
| BET Surface Area: | 86.838 m$^2$/g |
| Slope: | 0.050268 |
| Intercept: | −0.00015 |
| C_value: | 0 |
| Monolayer Volume: | 19.9518 cc/g (STP) |
| Correlation Coefficient: | 0.99967 |
| One Point BET Surface Area (Ps/Po = 0.3): | 87.439 m$^2$/g |

In addition, pore size distributions of the char sample were calculated according to the Barrett-Joyner-Halenda (BJH) method. A BJH pore volume of the char sample calculated from the desorption branch of a nitrogen sorption isotherm was measured to 0.01795 ml/g (BJH pore volume calculated from the adsorption branch: 0.02218 ml/g). Empirical results from the corresponding analysis are provided in Tables 2 and 3 below.

TABLE 2

Desorption BJH Pore Size Distribution

| Pore Dia. Range(nm) | Pore Volume (ml/g) | % | Average Dia. | Cumulative % |
| --- | --- | --- | --- | --- |
| | | | 0 | 0 |
| Under 6 | 0.01267 | 70.59 | 5 | 70.59 |
| 6-8 | 0.00097 | 5.39 | 7 | 75.98 |
| 8-10 | 0.0004 | 2.26 | 9 | 78.24 |
| 10-12 | 0.00045 | 2.52 | 11 | 80.76 |
| 12-16 | 0.00051 | 2.82 | 14 | 83.58 |
| 16-20 | 0.0006 | 3.32 | 18 | 86.9 |
| 20-80 | 0.00196 | 10.92 | 50 | 97.82 |
| Over 80 | 0.00039 | 2.18 | 115 | 100 |
| BJH Total | 0.01795 | 100 | | |

TABLE 3

Adsorption BJH Pore Size Distribution

| Pore Dia. Range(nm) | Pore Volume (ml/g) | % | Average Dia. | Cumulative % |
| --- | --- | --- | --- | --- |
| | | | 0 | 0 |
| Under 6 | 0.00813 | 36.64 | 5 | 36.64 |
| 6-8 | 0.00261 | 11.77 | 7 | 48.41 |
| 8-10 | 0.00154 | 6.95 | 9 | 55.36 |
| 10-12 | 0.00135 | 6.08 | 11 | 61.44 |
| 12-16 | 0.00153 | 6.88 | 14 | 68.32 |
| 16-20 | 0.00128 | 5.78 | 18 | 74.1 |
| 20-80 | 0.00448 | 20.21 | 50 | 94.31 |
| Over 80 | 0.00126 | 5.69 | 115 | 100 |
| BJH Total | 0.02218 | 100 | | |

As shown in Tables 2 and 3, about 70% of the BJH total pore volume was contributed by pores with pore diameters of under 6 nm based on the desorption branch and about 37% of the BJH total pore volume was contributed by pores with pore diameters of under 6 nm based on the adsorption branch. These results indicate that the char sample was highly porous with a large surface area for adsorption per unit mass.

Softening Characteristics of Type II Tar

A. Heating and Observations

Type II tar (the brittle) was heated on a hot plate to observe the softening temperature. Table 4 below shows different stages of the brittle heating.

TABLE 4

Heating of type II tar

| Temperature (° C.) | | |
| --- | --- | --- |
| Tar | Hot Plate | Observations |
| 60 | 80 | Brittle is stuck to bottom of beaker |
| | | Brittle is starting to melt at base |
| 80 | 100 | Completely melted |
| | | Wetted the entire bottom of the beaker |
| | | Still very viscous |
| 95 | 120 | No change |
| 115 | 150 | Viscosity is greatly reduced |
| 130 | 200 | Vapours are visible above the tar |
| | | Tar droplets are condensing on the beaker walls |

The softening point of the brittle was estimated to be around 115° C. The Tg of the brittle was estimated to be around 60° C.

B. Differential Scanning Calorimetry Analysis

Differential Scanning calorimetry (DSC) was used to obtain information on glass transition and softening characteristics of tar type II (the brittle). The DSC test was carried out on a Universal V4.5A differential scanning calorimeter (TA Instruments, Inc., Delaware, USA). The test was performed at a heating/cooling rate of 20° C./min under nitrogen atmosphere over a temperature range of −20° C.-400° C.

Figure 7:
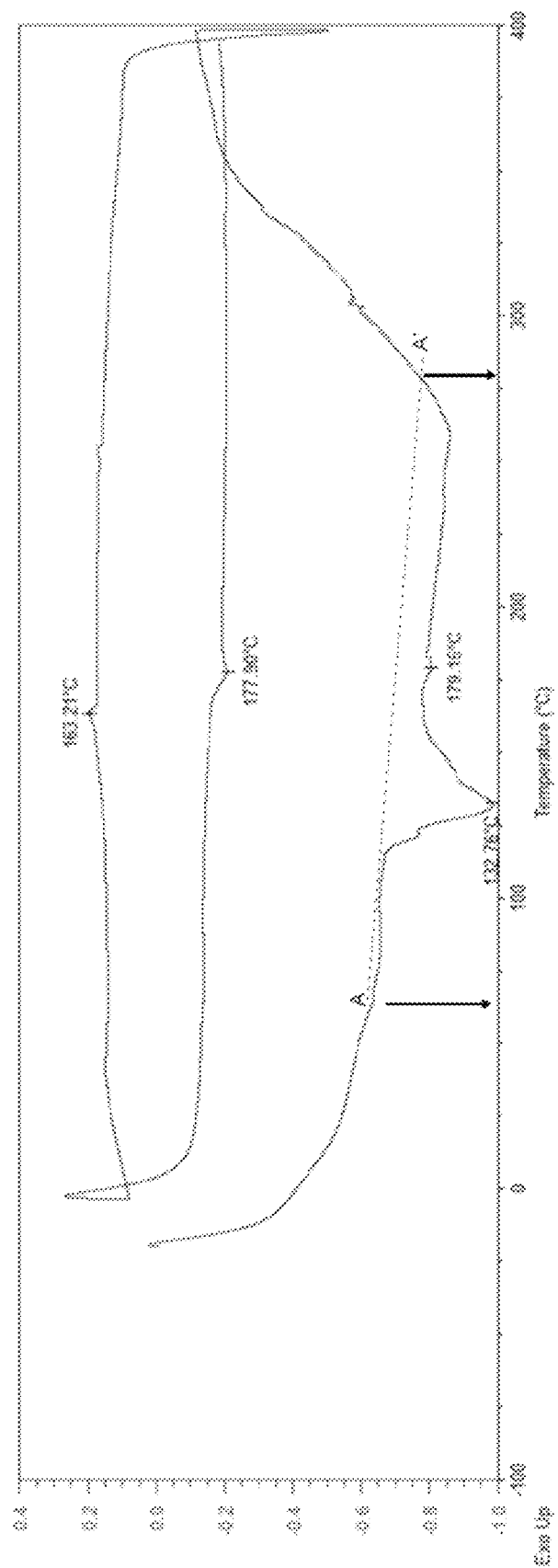
FIG. 7 is a graph illustrating the heat flow of an example tar composition as a function of temperature.

FIG. 7 is the plot of the heat-cool-heat cycles which starts on the lower line, then the topmost line, and finally the center line. For the first heating cycle (the lower line), a slight endothermic peak was observed at approximately 62° C., which was considered to be Tg of the brittle. In addition, a distinct endothermic transition approximately between 115° C. and 160° C. with a peak at 133° C. was observed. These endothermic transitions were consistent with the observations of heating of the tar brittle noted in Table 4, which indicates that at the temperature of 60° C., the tar material started to lose its brittleness and get sticky; and that at the temperatures of 115° C. and higher, the viscosity of the tar was greatly reduced.

Although the tar sample exhibited a distinct DSC melting peak, this was not a melting point relating to the phase transition of a substance from a solid a liquid. Tars do not have any definite melting points but instead become softer and less viscous as the temperature increases above Tg. Dash line A-A' in FIG. 7 shows the softening trend of the tar sample over the temperature range above its observed Tg (i.e., about 60° C.) with steadily increasing heat absorption.

The overall softening trend indicated with A-A' ended at approximately 280° C., with a broad endothermic peak at approximately 263° C. After then, another thermal transition followed, in which heat absorption by the tar sample rapidly decreased until the temperature reached around 350° C., and slowed down thereafter. Around 305° C., a slight peak was also observed. As shown by the cooling cycle (the topmost line) and the second heating cycle (the center line), the thermal transition above approximately 280° C. was irreversible. It indicates that the transition was related to the coking of the tar sample, during which the tar lost its chemical matrix that would allow it to re-melt and, instead, formed a permanent carbon matrix ("coke"). It was also observed that the tar sample swelled up in the DSC pan during the DSC analysis.

Preparation of Biocoal Fuel Product Samples

The raw char was ground in a mortar and pestle until it was deemed sufficiently small, then the ground char was screened below 1.7 mm and particles above 1.7 mm ground further. A particle size analysis of the ground char showed a bi-modal distribution with peaks at 45 and 750 µm. This is typical of char, which generates a large fraction of fines upon grinding. The volume weighted mean particle size of the char was 263 µm. It was observed when sieving the ground material below 1.7 mm that the remaining oversized particles were only slightly larger than those falling through the sieve, and were primarily less than 2.5 mm in size.

Pellet Production

Empirical testing was conducted with different pellet production methods.

a) Cold Mixing of Ground Pellet Material

In a first method, the tar brittle and the char were ground separately and then mixed together. To achieve better dispersion of tar powder, the char and tar brittle were ground together. It was observed that 50 wt % tar produced a more durable, less dusty pellet with this method. A reduction to 45 wt % tar produced lesser quality pellets, having an average durability of 96.9% as compared to 99.4% for 50 wt % and 99.3% for 48 wt % pellets.

b) Hot Mixing of Liquid Tar "Taffy"

In a second method, to obtain a better dispersion of tar in the ground char, the mixing was conducted with hot char and hot tar. This was done by heating the char in a pestle, and mixing in hot, liquid tar taffy. The tar and char were pre-heated to 120° C. This mixing method produced very durable pellets even at lower tar concentrations of 29 wt %.

Some pellet material was mixed by stirring with a stir bar. Other pellet material was mixed using a hot pestle and the liquid tar 'ground' with the char. The mixed material was then reheated briefly (<10 min) and loaded into a pre-heated pellet die. The dies were preheated to the pelletizing temperature in an oven. The mass of the die gave sufficient thermal inertia to avoid cooling while loading material and pelletizing. Two pellets were made with a cold die and hot material. These pellets showed a lot more surface dust and hence of lower quality than the pellets made in the hot die.

c) Hot Mixing of Liquid Tar "Brittle"

A few pellets were made by mixing hot char with liquid tar brittle. The char and tar were pre-heated to 150° C. The method produced very durable pellets even at low concentrations of tar, such as 36 wt %.

d) Hot Grinding of Char and Liquid Tar "Taffy"

Furthermore, some pellets were produced by pouring the liquid tar "taffy" over hot, un-ground char and grinding the two together. This method required a lot more energy to get a fine grind of the char. Even after extensive grinding in the mortar and pestle, there were still larger (about 3-4 mm) pieces of char remaining. This method did however, produce some of the strongest pellets with an average durability of 99.7%.

Effect of Pelletizing Conditions

Pelletizing pressures are typically between 100 and 200 MPa for standard wood pellets. To determine the effects of varying pelletizing pressure, pellets were made with different press pressures during pelletization. A press pressure of 10 tonnes (near the maximum pressure of the test apparatus) produced the best pellets. This corresponds to a pressure of 122 MPa and 312 MPa for die diameters of 20 and 32 mm, respectively.

During testing, it was also noted that die temperature has an effect on the quality of pellets being produced. Use of a cold die surface, such that it was apparent the pressed material had cooled on the cold die surface tended to produce a lower quality pellet with rough edges.

Quality Testing of the Biocoal Fuel Product Samples

A. Density

Figure 4:
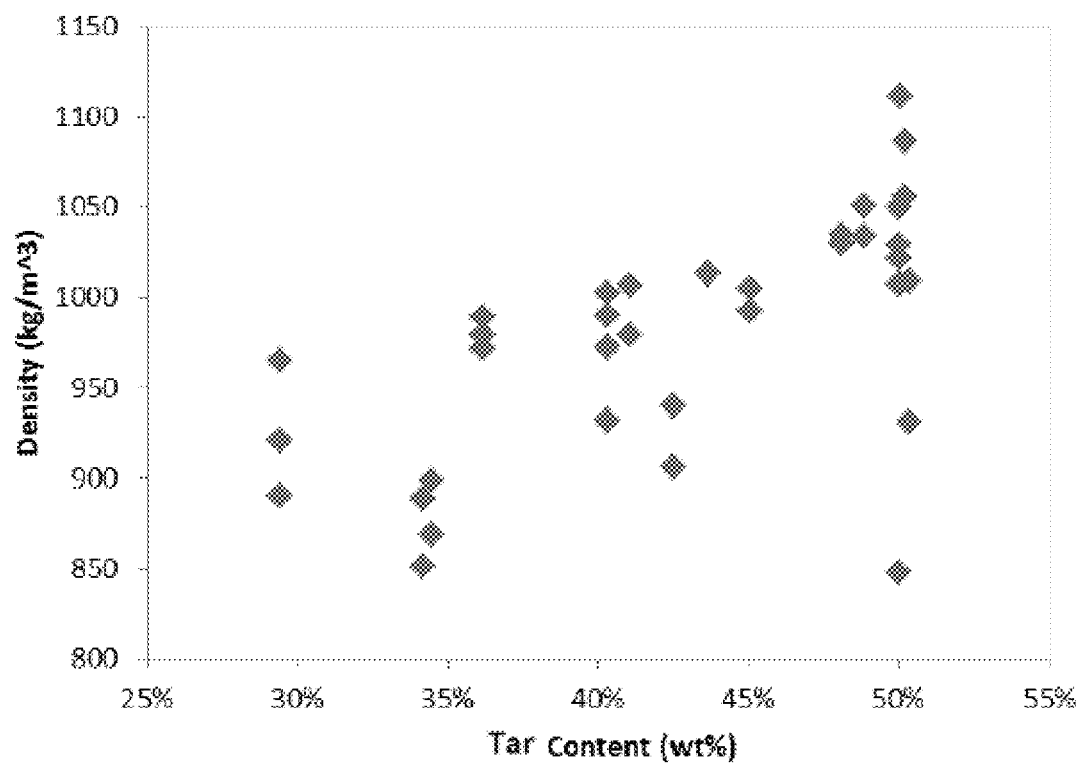
FIG. 4 is a graph illustrating the relationship between the tar content and the density of some example biocoal pellets.

The density of the sample pellets was measured in the range of 850-1,110 kg/m$^3$, with an average density of the high quality pellets of 986 kg/m$^3$. There was a slight trend of increasing density with tar content, as shown in FIG. 4. The plot in FIG. 4 does not take into account the method of preparation of individual sample pellets as described above. In general, cold mixing produced pellets of lower density. There was a more definite effect of the pelletizing pressure on the final pellet density, with the higher the pelletizing pressure the higher the density of the pellets.

B. Durability

The durability of the sample pellets was tested in a Ligno-tester according to the EN 14961-2 standard. Pellets that were observed to lack durability upon handling were left out of the durability tests. The remaining pellets were numbered divided up into three lots such that pellets of similar composition were in different lots and each lot contained an equal amount of 20 and 32 mm diameter pellets. Each lot of pellets was loaded into the Ligno-tester and a fines removal cycle was run. The results of this testing are shown in Table 5 below.

TABLE 5

Durability testing results

| Pellet | Pellet # | Lot | Fines (wt %) | 1st Durability | 2nd Durability | After Moisture Uptake Tests |
|---|---|---|---|---|---|---|
| 1 | I | 1 | 0.45% | 98.97% | 97.19% | 97.65% |
| 2 | II | 2 | 0.60% | 96.67% | — | — |
| 3 | III | 1 | 0.17% | 97.51% | — | — |
| 4 | X | 3 | 2.13% | 44.33% | — | — |
| 6 | XI | 2 | 4.16% | 88.46% | — | — |
| 9 | XII | 3 | 0.20% | 0.00% | — | — |
| 1 | XIII | 2 | 0.00% | 99.81% | 99.82% | 98.59% |
| 2 | XIV | 3 | 0.06% | 98.88% | 99.52% | 98.91% |

TABLE 5-continued

Durability testing results

| Pellet | Pellet # | Lot | Fines (wt %) | 1st Durability | 2nd Durability | After Moisture Uptake Tests |
|---|---|---|---|---|---|---|
| 3 | XV | 3 | 0.35% | 95.79% | — | — |
| 4 | XVI | 1 | 0.02% | 97.98% | — | — |
| 5 | XVII | 2 | -0.02% | 99.61% | 99.69% | 99.78% |
| 1 | XIX | 1 | 0.05% | 99.65% | 98.65% | 97.37% |
| 2 | XVIII | 2 | 0.42% | 98.94% | 99.08% | 98.15% |
| 3 | XX | 2 | -0.04% | 99.52% | 99.71% | 95.28% |
| 4 | XXI | 3 | -0.04% | 99.80% | 99.92% | 99.26% |
| 5 | XXII | 1 | 0.17% | 77.94% | — | — |
| 6 | XXIII | 2 | 1.54% | 90.38% | — | — |
| 1 | XXIV | 1 | -0.10% | 100.17% | 99.71% | 97.70% |
| 1 | XXV | 3 | -0.10% | 99.42% | 99.69% | 97.98% |
| 2 | XXVI | 1 | -0.11% | 100.10% | 98.80% | 96.74% |
| 3 | XXVII | 2 | 1.24% | 94.27% | — | — |
| 4 | XXIX | 3 | -0.01% | 99.67% | 99.76% | 98.15% |
| 5 | XXVIII | 1 | -0.11% | 100.07% | 99.70% | 99.01% |
| 1 | IV | 2 | -0.10% | 99.81% | 99.74% | 98.47% |
| 2 | V | 1 | -0.08% | 100.07% | 99.75% | 99.03% |
| 3 | VI | 3 | 0.03% | 99.18% | 99.38% | 96.72% |
| 5 | VII | 1 | -0.08% | 100.04% | 99.66% | 98.12% |
| 6 | VIII | 2 | -0.06% | 99.71% | 99.76% | 99.28% |
| 7 | IX | 3 | 0.07% | 97.72% | 98.52% | 95.61% |

Figure 5A:
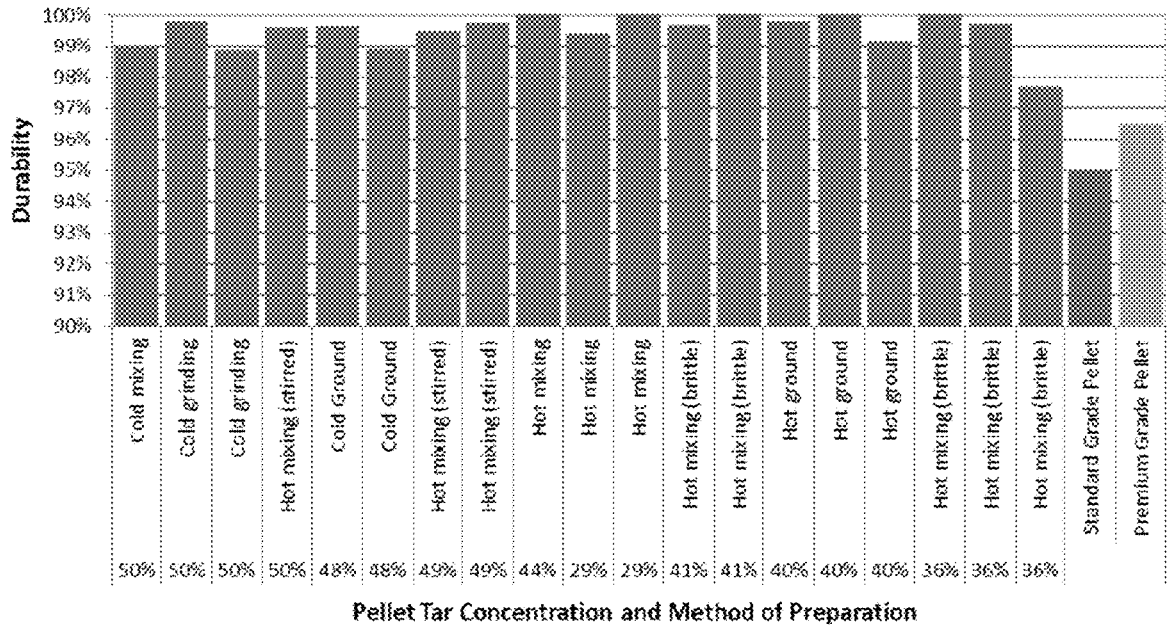
FIGS. 5A and 5B are graphs illustrating the durability of some example biocoal pellets based on the tar content/preparation method of the same.
Figure 5B:
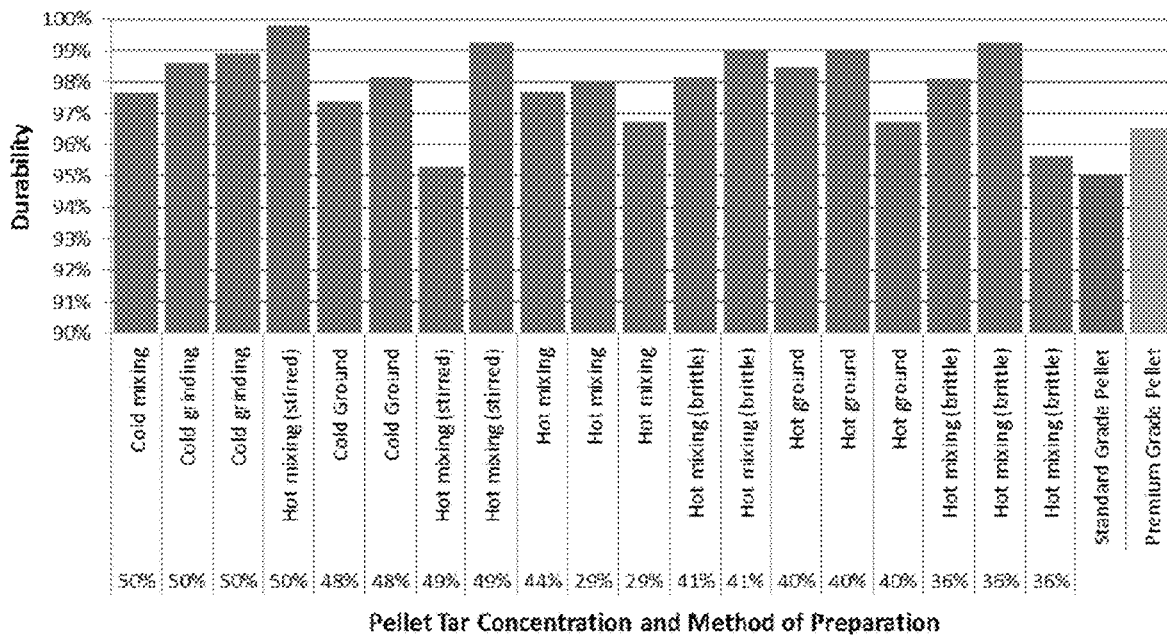

The sample pellets were weighed and re-loaded into the tester for a durability cycle. Some pellets increased in mass during the fines removal cycle and the first durability run. This is likely a result of fines from other pellets becoming stuck to tar on the pellet surface. After the first durability cycle, the pellets that performed the best were placed back into the tester and a second durability cycle was run. A third durability cycle was run on the pellets after they had undergone moisture absorption tests described below, that is, after becoming completely saturated and re-dried. During this testing protocol, the high quality pellets all retained high durability. FIG. 5A and FIG. 5B illustrate durability results for samples of particular tar concentrations and methods of preparation, after the first and third durability testing cycles, respectively. Generally speaking, pellets produced by mixing the tar as a hot liquid produced more durable pellets.

C. Moisture Uptake

The pellets that performed the best during the durability testing were also used for moisture uptake testing. The pellets were first dried in an oven at a temperature of 95 to 105° C. overnight, and then the initial moisture content was determined, as shown in Table 6 below. The pellets were then submerged in de-ionized water. After 1 hour in water the pellets were rinsed with de-ionized water, patted dry, weighed to determine the moisture uptake, and re-submerged. This process was repeated for 3, 7, and 36 hours of submersion. Moisture uptake was increased with submersion time. The rate of moisture uptake was highest in the first hour of submersion, but slowed down between 7 and 36 hours. It was assumed that after 36 hours of submersion, the pellets were completely saturated.

TABLE 6

Moisture uptake test results

| Pellet | Pellet # | Moisture (wt %) | Moisture Uptake | | | | | Mass Loss (wt %) | Moisture Re-absorbed |
|---|---|---|---|---|---|---|---|---|---|
| | | | 1 hr | 3 hrs | 7 hrs | 36 hr | Air dry | | |
| 1 | I | 3.6% | 16.1% | 18.8% | 21.2% | 28.4% | 18.1% | 1.3% | 1.27% |
| 1 | IV | 2.5% | 20.6% | 21.8% | 22.6% | 28.5% | 15.5% | 4.7% | 1.71% |
| 2 | V | 1.7% | 9.5% | 11.6% | 12.9% | 19.4% | 12.8% | 2.4% | 1.50% |
| 3 | VI | 2.4% | 21.1% | 23.0% | 24.0% | 28.5% | 12.8% | 5.8% | 1.74% |
| 5 | VII | 1.1% | 20.0% | 22.4% | 24.6% | 29.5% | 19.9% | 0.6% | 1.70% |
| 6 | VIII | 1.0% | 20.5% | 22.8% | 24.9% | 30.0% | 20.6% | 0.4% | 1.52% |
| 7 | IX | 0.9% | 23.8% | 25.4% | 26.1% | 32.9% | 19.0% | 0.9% | 1.60% |
| 1 | XIII | 0.7% | 2.5% | 4.5% | 6.3% | 12.1% | 9.2% | 0.3% | 1.07% |
| 2 | XIV | 0.8% | 10.2% | 12.2% | 13.1% | 16.6% | 10.8% | 0.2% | 1.18% |
| 5 | XVII | 2.2% | 15.2% | 16.4% | 17.2% | 19.0% | 8.6% | 5.2% | -1.37% |
| 2 | XVIII | 1.0% | 15.2% | 17.7% | 19.8% | 26.1% | 16.8% | 1.0% | 1.19% |
| 1 | XIX | 3.9% | 14.0% | 16.6% | 18.6% | 24.6% | 13.9% | 1.8% | 1.23% |
| 3 | XX | 2.8% | 17.1% | 19.0% | 20.0% | 26.4% | 11.3% | 6.9% | 1.51% |
| 4 | XXI | 1.5% | 12.0% | 13.8% | 14.7% | 19.9% | 12.2% | 3.7% | 1.55% |
| 1 | XXIV | 2.3% | 15.6% | 17.6% | 18.5% | 23.5% | 12.0% | 5.1% | 1.73% |
| 1 | XXV | 2.3% | 30.7% | 34.1% | 34.2% | 36.2% | 22.2% | 5.0% | 1.89% |
| 2 | XXVI | 2.4% | 34.4% | 38.4% | 38.8% | 41.6% | 28.0% | 5.4% | 1.77% |
| 5 | XXVIII | 1.0% | 16.0% | 20.2% | 22.4% | 27.3% | 20.5% | 0.6% | 1.51% |
| 4 | XXIX | 1.0% | 17.7% | 21.0% | 23.4% | 28.5% | 20.8% | 0.9% | 1.46% |

Figure 6:
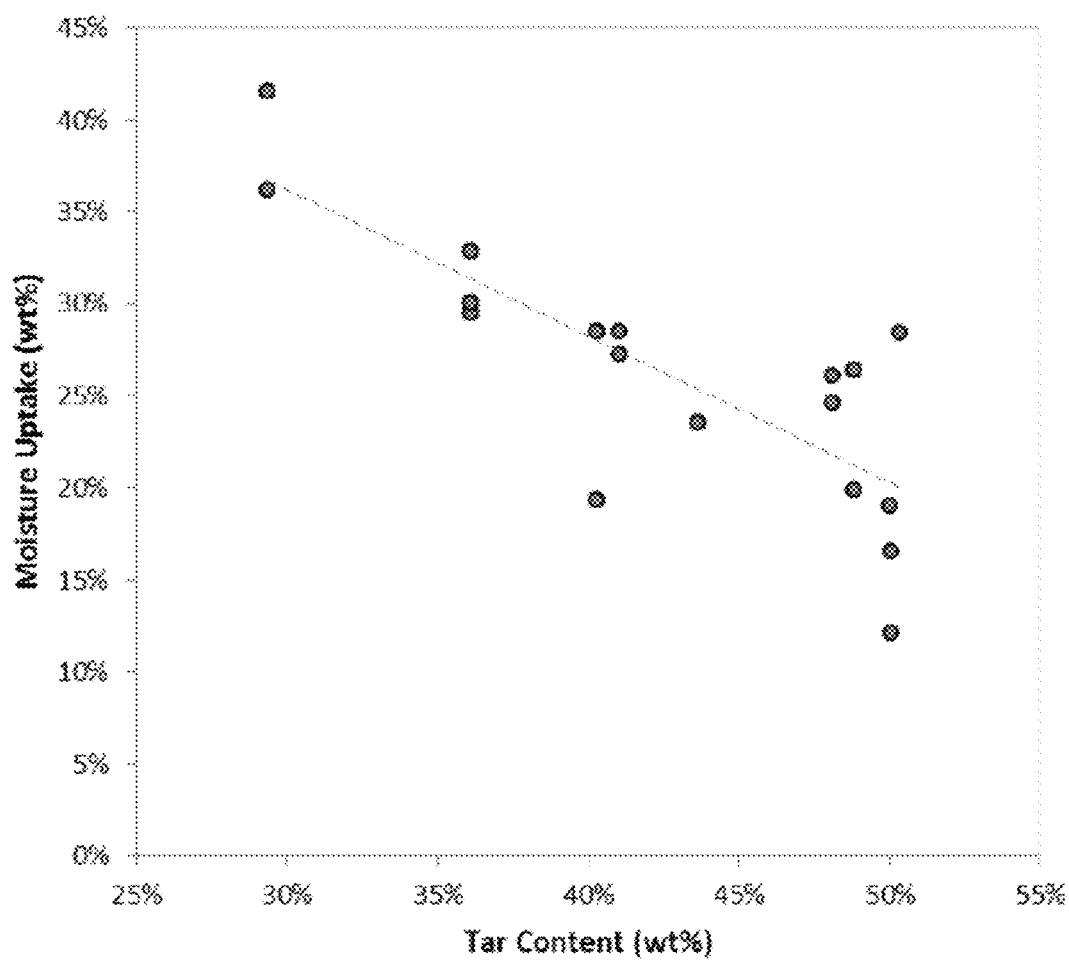
FIG. 6 is a graph illustrating the relationship between the tar content and the moisture uptake of some example biocoal pellets.

After the 36 hour uptake results were obtained, the pellets were allowed to dry in the ambient air on paper towels for 6 hours. The pellets were re-dried in an oven at a temperature of 95-105° C. overnight to determine the mass loss from leaching and loss of surface fines. Moisture uptake was primarily dependent on the tar content, and only somewhat on the mixing method. A graph of the relationship between tar content and moisture uptake is provided in FIG. 6. Generally speaking, the empirical results show that moisture uptake decreases with increasing tar content, likely due to a decrease in internal surface area as more pores in the interior are filled.

D. Energy Content

The energy content or Higher Heating Value (HHV), of the highest quality pellets was measured using a Parr 6200 Calorimeter™ (Parr Instrument Company, Moline, Illinoi, USA) using ground samples of pellets prepared with the char, tar brittle, and the tar taffy. The mass of the samples for HHV testing was 0.82±0.25 g. The testing results are listed in Table 7, with the energy density calculated based on the individual pellet density.

TABLE 7

Energy content of select pellets and raw materials

| Durability Index | Tar Type | Wt % | HHV Btu/lb | MJ/kg | MJ/m³ |
|---|---|---|---|---|---|
| V | Taffy | 40% | 12,842 | 29.87 | 29,053 |
| VIII | Brittle | 36% | 13,247 | 30.81 | 29,940 |
| XIII | Brittle | 50% | 12,978 | 30.19 | 33,563 |
| XIV | Brittle | 50% | 13,107 | 30.49 | 30,715 |
| XXI | Taffy | 49% | 12,639 | 29.40 | 30,901 |
| XXIV | Taffy | 44% | 12,761 | 29.68 | 30,091 |
| XXV | Taffy | 29% | 12,994 | 30.22 | 29,161 |
| XXIX | Brittle | 41% | 13,212 | 30.73 | 30,935 |
| Char | | | 12,144 | 27.84 | — |
| Tar Brittle | | | 13,035 | 30.32 | — |
| Tar Taffy | | | 11,040 | 25.68 | — |

Of the raw materials, the tar brittle had the highest HHV and the tar taffy the lowest. This is due to the higher degree of thermal treatment of the brittle, which removed the more volatile compounds of lower heating value. This also gives pellets produced with the tar brittle a higher HHV compared to pellets made with the taffy. The pellets had an average HHV of 30.2±0.5 MJ/kg or 12,900±200 BTU/lb.

The heating value of the pellets decreased slightly with increasing tar concentration, indicating that the char had a higher heating value than the tar. The raw tar was found to have a lower heating value than all the pellets produced. The heating value of pure carbon is 33.96 MJ/kg.

E. Proximate Analysis

The two best performing sample pellets, referred to as V and XIII in the previously discussed results, were also analysed in a thermogravimetric analyzer (TGA) (Setsys™ 1750, Setaram Instrumentation KEP Technologies, Caluire France) to determine moisture, volatile, fixed carbon, and ash content of the pellets. The results of this analysis are listed in Table 8.

TABLE 8

Proximate analysis of select pellets and raw biochar

| Durability Index | Tar Type | Wt % | Proximate Analysis (wt %) | | |
|---|---|---|---|---|---|
| | | | Moisture | Volatiles | Fixed Carbon | Ash |
| V | Taffy | 40% | 0.8 | 27.1 | 70.5 | 1.6 |
| XIII | Brittle | 50% | 0.9 | 38.5 | 58.7 | 2.0 |
| Char | | | 10.7 | 2.3 | 85.1 | 1.9 |

The raw char tested had high moisture content likely a result of absorption of moisture from the air onto the char due to its high surface area. As expected, the volatile content increased with increasing tar concentration. The char's fixed carbon content was 95.3% on a dry basis. A proximate analysis was not conducted on the tar, but based on the volatile content of the pellets and char, by calculation the volatile content of the tar was estimated at 65-75 wt %.

As many possible embodiments may be made of the invention without departing from the scope of the claims, it is to be understood that all matter herein set forth or shown in this description and the accompanying drawings is to be interpreted as illustrative of certain example embodiments, and not in a limiting sense. It will be appreciated by those skilled in the art that other embodiments may also be practised without departing from the scope of the invention.

What is claimed is:

1. A system for producing a fuel product from a biomass, the system comprising:
   a carbonizing unit configured to perform pyrolysis of the biomass to produce a solid phase char and a tar-laden gas, the carbonizing unit comprising a gas outlet through which the tar-laden gas exits the carbonizing unit;
   a condensing unit configured to receive the tar-laden gas from the carbonizing unit, to produce a liquid phase tar, and to stratify the liquid phase tar into heavier liquid phase tar and lighter liquid phase tar, the condensing unit comprising a gas inlet through which the tar-laden gas enters the condensing unit;
   a gas connection unit for gas connection between the carbonizing unit and the condensing unit, the gas connection unit comprising a gas pipeline that is continuous from the gas outlet of the carbonizing unit to the gas inlet of the condensing unit; and
   a mixing unit configured to receive the solid phase char from the carbonizing unit and the heavier liquid phase tar from the condensing unit, the mixing unit operable to mix the solid phase char and the heavier liquid phase tar;
   a shaping unit configured to compact into pellets or briquettes a mixture of the solid phase char and the heavier liquid phase tar produced by the mixing unit, thereby producing the fuel product.

2. The system of claim 1, further comprising:
   a dryer unit configured to supply dried biomass to the carbonizing unit.

3. The system of claim 2, further comprising:
   a combustion unit configured to receive a combustible gas from at least one of the carbonizing unit and the condensing unit and to combust said combustible gas for at least partially heating the dryer unit.

4. The system of claim 1, wherein the condensing unit is configured to reheat the liquid phase tar to a pre-determined temperature prior to the stratification.

5. The system of claim 4, wherein the condensing unit comprises a separate tank for the reheating and stratification of the liquid phase tar.

6. The system of claim 5, wherein the separate tank is configured to receive the liquid phase tar in which a fraction containing acids is present without being separated.

7. The system of claim 1, wherein the carbonizing unit comprises a vertically-oriented steel bin for an updraft operation mode.

8. The system of claim 7, wherein the carbonizing unit is further configured to discharge the solid phase char at the bottom portion of the carbonizing unit.

9. The system of claim 7, wherein the condensing unit comprises a vertically-oriented reactor.

10. The system of claim 9, wherein the gas outlet is provided to the top portion of the carbonizing unit and the gas inlet is provided to the top portion of the condensing unit.

11. The system of claim 10, wherein the condensing unit comprises a tank for collecting the liquid phase tar.

12. The system of claim 11, wherein the tank is located below the vertically-oriented reactor.

13. The system of claim 11, wherein the condensing unit is further configured to separate a fraction containing acids from the liquid phase tar.

14. The system of claim 13, wherein the acids include acetic acid.

* * * * *